United States Patent [19]

Mahr et al.

[11] 4,370,212

[45] Jan. 25, 1983

[54] ELASTOMERIC FILM

[75] Inventors: Tibor G. Mahr; Pallatheri M. Subramanian, both of Wilmington, Del.

[73] Assignee: E. I. Du Pont de Nemours and Company, Wilmington, Del.

[21] Appl. No.: 259,422

[22] Filed: May 1, 1981

[51] Int. Cl.[3] .............................. C08F 8/12; C08F 8/42
[52] U.S. Cl. ................................ 204/159.14; 264/22; 427/36; 427/180; 428/208; 428/330; 428/331; 428/447; 428/451; 428/463; 428/522
[58] Field of Search ............... 428/208, 330, 331, 447, 428/451, 463, 522; 204/159.14; 427/36; 264/180, 22

[56] References Cited

U.S. PATENT DOCUMENTS

| | | | |
|---|---|---|---|
| 3,160,575 | 12/1964 | Bartl et al. | 204/154 |
| 3,391,129 | 7/1968 | Sparks | 260/86.7 |
| 3,547,858 | 12/1970 | Worrall | 260/87.3 |
| 3,809,671 | 5/1974 | Okawa et al. | 260/41 R |
| 4,078,128 | 3/1978 | Hoyt et al. | 526/10 |
| 4,122,062 | 10/1978 | Monte et al. | 260/42.14 |
| 4,137,364 | 1/1979 | Ball et al. | 428/412 |
| 4,170,690 | 10/1979 | Armbruster et al. | 428/447 |
| 4,177,315 | 12/1979 | Ubersax | 428/331 |
| 4,224,262 | 9/1980 | Baird et al. | 264/22 |

FOREIGN PATENT DOCUMENTS

| | | | |
|---|---|---|---|
| 647190 | 8/1962 | Canada | 204/93.3 |
| 45-12239 | 5/1970 | Japan . | |
| 899774 | 6/1962 | United Kingdom . | |

*Primary Examiner*—Stanford M. Levin

[57] ABSTRACT

A surface treatment for ethylene/vinyl acetate copolymer film resulting in an elastomeric, heat sealable film which retains its transparency after release from 200 percent elongation. The treatment comprises irradiation and controlled surface hydrolysis and, optionally, subsequent attachment of mineral particulates to the surface of the film with or without the use of coupling agents.

20 Claims, No Drawings

ELASTOMERIC FILM

BACKGROUND OF THE INVENTION

The subject invention relates to the treatment of copolymer films with a combination of crosslinking and surface treatments to obtain an elastomeric product which will retain its transparency upon relaxation after being stretched, be free of surface tack, and have surface characteristics such that the film displays acceptable heat sealability. Such a product may be used for packaging both food and nonfood items.

The development of copolymer films useful in the packaging industry has been an active area of experimentation for many years. Currently, there are generally two types of films used for packaging purposes. The first is heat-shrinkable film which, due to the temperature required to shrink-wrap such a film around a product, is undesirable for most fruit and vegetable packaging, as well as heat-sensitive nonfood packaging. The second is stretch film such as polyvinylidene chloride which lacks elastomeric properties and hence is not as desirable for packaging as are films which display more acceptable levels of elastic recovery. The object of this invention, therefore, is to devise a process whereby an elastomeric copolymer film can be treated so as to enhance its form stability, while remaining free of surface tack, transparent upon relaxation after being stretched and heat sealable.

It is known that crosslinking molecules of an elastomeric film such as ethylene/vinyl acetate copolymer (hereinafter EVA), containing about 35–50 percent copolymerized vinyl acetate by weight, by exposure to high energy ionizing radiation, results in a film with enhanced form stability, i.e., creep resistance. This crosslinking can be achieved by exposure to high energy radiation such as electrons, X-rays, gamma rays, etc., a dosage of such irradiation being measured in "rads" wherein one rad is the absorbed dose of ionizing radiation equal to an energy of 100 ergs per gram of irradiated material. A megarad (MR) is equal to one million rads. Crosslinked EVA displaying such form stability, however, is not satisfactory for stretchable film packaging due to excess surface tack which creates handling problems both in production windup and machine packaging applications.

The problem of surface tack associated with EVA has also been addressed by prior teachings. It is known that hydrolysis of EVA pellets render the pellets nonagglomerizable. It is also known that hydrolysis of the surface of EVA film removes the undesirable surface tack. However, hydrolysis of EVA referred to in prior teachings is carried out to such an extent that both elasticity and transparency after stretching would be lost from EVA in a film form.

Further, the combination of crosslinking EVA by irradiation techniques followed by hydrolysis with subsequent film formation has recently been addressed in U.S. Pat. No. 4,224,262 on the application of Baird et al. There the object of the invention was to produce a packaging film that would not be deleteriously affected by moisture and would, at the same time, serve as a barrier to oxygen permeation. To accomplish this objective, Baird et al. irradiated EVA copolymer containing 45 percent vinyl acetate by weight of the copolymer and subsequently carried out greater than 96 percent hydrolysis of the copolymer. A resin was recovered and pressed into a film of a crosslinked copolymer of an olefin and a vinyl alcohol. Because of the high degree of hydrolysis present throughout the thickness of the film, a total loss of elasticity is observed.

SUMMARY OF THE INVENTION

It has been found that when EVA, with polymerized vinyl acetate content about 35–50 percent by weight of the copolymer, is irradiated and subsequently hydrolyzed or alcoholyzed under carefully controlled conditions, that a resulting film exhibits greater form stability, greater impact strength, retains more than 85 percent elastic recovery after 200 percent elongation, retains its transparency upon relaxation after being stretched, and exhibits good heat sealability, the latter measured by heat sealing two films together at 100°–200° C. for 3 seconds at $1 \times 10^5$ Pa, then measuring the force needed to peel the two films apart. For purposes of this invention, an acceptable heat seal requires a force greater than 77 gm/cm$^2$ to pull apart the two films. The product of this treatment is a crosslinked EVA film containing about 35–50 percent copolymerized vinyl acetate by weight of the copolymer comprising greater than about 80 percent of the acetate groups in the film to a depth of 0.5 microns being hydrolyzed or alcoholyzed while hydrolyzing or alcoholyzing less than 80 percent of the acetate groups at depths greater than 0.5 micron.

One drawback from this discovery, however, is the narrow time range within which the hydrolysis or alcoholysis must be carried out to achieve the desired result as too little hydrolysis or alcoholysis does not sufficiently remove the surface tack on the irradiated film and too much hydrolysis or alcoholysis causes the film to lose both its elasticity and its transparency upon relaxation after being stretched. In the commercial manufacturing of film, it is desirable and often economically critical, to operate the production line at as fast a speed as possible while maintaining acceptable product quality. It is, therefore, desirable to design a process whereby the lower limit of the time range for hydrolysis or alcoholysis can be shortened.

In order to expand the range of hydrolysis or alcoholysis required to achieve the desired film qualities, it has been further discovered that certain mineral constituents, with or without the use of coupling agents, can be attached to the surface of the film while still retaining the film's elastic, transparent and heat-sealable properties without evidence of prohibitive surface tack. The product of this treatment is crosslinked EVA film containing about 35–50 percent vinyl acetate by weight of the copolymer comprising greater than about 50 percent of the acetate groups in the film to a depth of 0.5 microns being replaced by hydroxyl groups, and less than 50 percent of the acetate groups to depths greater than 0.5 microns being so replaced. Finely divided mineral particulates are then attached to the film surface with or without the use of coupling agents.

DETAILED DESCRIPTION OF THE INVENTION

EVA containing about 35–50 percent polymerized vinyl acetate by weight is irradiated with a dosage of 0.5 to 16 MR radiation. This irradiation can of course be applied to the EVA after film formation, which is preferable, or a portion of the irradiation can be applied to the EVA before extrusion into film form, the only practical limitation being that if too much irradiation is carried out prior to film formation, the EVA will not be extrudable. With such a limitation in mind, the total irradiation dosage must be within the above stated range, i.e., 0.5 to 16 MR. Such irradiation induces the desired amount of crosslinking of the molecules of the copolymer, resulting in an elastomeric film with enhanced form stability and impact strength suitable for stretching said film over and around a food or a non-food product. As mentioned above, this irradiation can be carried out by any of a number of conventional radiation techniques.

To remove surface tack common to this irradiated EVA film, the film is subjected to either alcoholysis, for example in a solution of sodium methoxide in methanol where the sodium methoxide concentration is greater than 15 percent by weight, or hydrolysis, for example, in a solution of potassium hydroxide in methanol where the potassium hydroxide concentration is greater than 25 percent by weight, thereby converting the acetate groups of the EVA film surface to hydroxyl groups. Alcoholic media is preferred for the alcoholyzing for two reasons. First, reagents such as $NaOCH_3$ are highly reactive with $H_2O$ and hence $H_2O$ interferes with the desired reaction, i.e., the conversion of acetate groups to a depth of 0.5 microns in EVA film into hydroxyl groups. Second, an aqueous medium slows the conversion of acetate groups to hydroxyl groups considerably, hence working against the object of the subject invention. For the purpose of the subject invention, the conversion of the required amount of acetate groups should be completed in well under a minute at about 25° C., hence, if an alcoholyzing or hydrolyzing reagent is used that is not highly reactive with $H_2O$, the process of the subject invention will tolerate the presence of up to about 15 percent $H_2O$ in the alcoholyzing or hydrolyzing medium. Further, if the temperature of the medium is raised to about 50° C., the desired conversion can take place in well under 30 seconds. Therefore, generally speaking, if hydrolysis or alcoholysis is to be carried out without minerals being present, it is critical that the film be subjected to hydrolysis or alcoholysis for a period of time long enough to hydrolyze or alcoholyze greater than about 80 percent of the acetate groups in the film to a depth of 0.5 microns.

Further, the degree of hydrolysis or alcoholysis has an upper limit in that too much hydrolysis or alcoholysis results in the film losing its transparency upon relaxation after being stretched as well as losing its elasticity. Consequently, the hydrolysis or alcoholysis must be carried out such that at depths in the film greater than 0.5 microns less than 80 percent of the acetate groups are converted to hydroxyl groups; at 2.0 microns, only a trace amount of hydroxyl groups are found; and at 5.0 microns, essentially no conversion of acetate groups to hydroxyl groups has taken place. This treatment may be accomplished in any conventional manner which creates contact between the film and the sodium methoxide or potassium hydroxide solution. The preferred method of measuring the degree of hydrolysis or alcoholysis is optical, that is, to measure at depths specified according to ANSI/ASTM E573-76 standard recommended practices for IRS with Perkin Elmer 221 IR spectrometer, Wilks GE internal reflection element (63×19 mm, 3 mm) at 45° angle.

Such a critically controlled hydrolysis or alcoholysis, however, is difficult to consistently achieve on a film manufacturing line as well as taking too much time to maintain operation of the line at desired film manufacturing speeds. For example, the contact time necessary to hydrolyze greater than 80 percent of the acetate groups in EVA film to a depth of 0.5 microns, while hydrolyzing less than 80 percent of the acetate groups at depths greater than 0.5 microns, in an approximately 25 percent by weight sodium methoxide solution in methanol is between 30 and 35 seconds at about 20° C.; less time does not sufficiently remove the film surface tack; a longer time causes the film to lose its elastic recovery and its transparency upon relaxation after being stretched. Of course, it should be pointed out that the degree of hydrolysis or alcoholysis is temperature dependent; the higher the temperature, the greater the degree of hydrolysis and vice versa; however, the treatment time window, in this case, 30 to 35 seconds at 20° C., remains quite narrow, and high temperatures necessary to shorten the contact time to accommodate film manufacturing speeds is impractical. Therefore, it is desirable to device an industrially viable process where the acceptable contact time for hydrolysis or alcoholysis at any given temperature is considerably shortened.

It has been discovered that attaching finely divided mineral particulates to the surface of the film allows the acceptable range of hydrolysis or alcoholysis of the acetate groups of the EVA film to be broadened and shortened. That is, when minerals are to be added to the film surface, only greater than 50 percent of the acetate groups in a depth of 0.5 microns need be hydrolyzed or alcoholized. Again, to prevent loss of transparency upon relaxation after being stretched, this hydrolysis or alcoholysis need be carried out such that at depths greater than 0.5 microns, less than 80 percent of the acetate groups are converted to hydroxyl groups. An exemplary list of finely divided mineral particulates which may be used in the practice of the subject invention comprise the following: "Minex" 7-Al-silicate with mean particle size of 2.3 microns, sold by Indusmin, Ltd. of Canada; Kaolin ASA LO with particle size below 2 microns, sold by Freeport Kaolin Co.; "Micro-White" 25-$CaCO_3$ with mean particle size 30 microns, sold by Sylacauga Calcium Products; Bentonite, described in the Fisher Scientific Company catalog #B-235; Imsil A-108, an amorphous silica with average particle size of 1.12 microns, sold by Illinois Mineral Co.; "Hi-Sil" 233, a hydrated amorphous silica with average particle size of 0.02 microns, sold by PPG Industries, Inc.; and Super Pflex 200-$CaCO_3$ with an average particle size of 0.5 microns, sold by Pfizer. However, any finely divided mineral particulate may be used as long as the particle size does not adversely affect the desired properties of the film, generally speaking, acceptable particle sizes being in the range of 0.1 to 150 microns.

It has been further discovered that attachment to the film of the above mentioned finely divided mineral particulates can be assisted, in some instances, by the use of certain coupling agents. This is, a coupling agent is attached to the surface of the film and the mineral is attached to the coupling agent. Exemplary eligible coupling agents described herein are titanate and silane coupling agents. The titanate coupling agents are more lenerally defined by one of the following formulas:

wherein R is a monovalent alkyl, alkenyl, alkynyl, or aralkyl group having from 1 to 30 carbon atoms or substituted derivatives thereof; A is a thioaroxy, sulfonyl, sulfinyl, diester pyrophosphate, diester phosphate, or a substituted derivative thereof; OAr is aroxy; B is OCOR' or OAr; R' is hydrogen or a monovalent organic group having from 1 to 100 carbon atoms; x+y+z equal 4; p+q equal 3; x, z and q may be 1, 2 or 3; and y and p may be 0, 1 or 2. Examples of preferable titanate coupling agents comprise the following: isopropyl, triisostearoyl titanate; diisostearoyl; ethylene titanate; isopropyl trimethacryl titanate; titanium dimethacrylate, oxyacetate; isopropyl, triacryl titanate; titanium diacrylate, oxyacetate; isopropyl tricumylphenyl titanate; titanium di(cumylphenolate) oxyacetate; isopropyl, tri(N ethylamino-ethylamino) titanate; isopropyl, tri(2-aminobenzoyl) titanate; isopropyl, tri(tetraethylenetriamine) titanate; isopropyl, tri(3-mecaptopropionyl) titanate; isopropyl triricinoyl titanate; isopropyl, tridodecylbenzenesulfonyl titanate; isopropyl, tri(dioctylphosphato) titanate; titanium di(dioctylphosphate) oxyacetate; di(dioctylphosphato)ethylene titanate; isopropyl tri(dioctylpyrophosphato) titanate; titanium di(-dioctylpyrophosphate) oxyacetate; di(dioctylpyrophosphato)ethylene titanate; tri(butyl, octyl pyrophosphato)isopropyl titanate; mono(dioctyl, hydrogen phosphite); titanium di(butyl, octyl pyrophosphate)di(dioctyl, hydrogen phosphite) oxyacetate; di(butyl, methyl pyrophosphato), isopropyl titanate mono(dioctyl, hydrogen) phosphite; di(butyl, methyl pyrophosphato)ethylene titanate mono(dioctyl, hydrogen phosphate); tetraisopropyl di(tridecylphosphito) titanate; tetraisopropyl, di(dioctylphosphito) titanate; tetraoctyloxytitanium di(ditridecylphosphite); and tetra(2,2 diallyloxymethyl-1-butoxy titanium di(di-tridecyl) phosphite. For a more detailed discussion of these titanate coupling agents, reference can be made to U.S. Pat. No. 4,122,062 assigned to Kenrich Petrochemicals, Inc., Bayonne, N.J., herein incorporated by reference.

The silane coupling agents are generally defined by the formula

YR—Si—(X)$_3$ where X represents a hydrolyzable group, typically alkoxy; Y represents a functional organic group such as amino, methacryloxy, or epoxy; and R is represented by an aliphatic linkage (CH$_2$)$_n$ where n is 0 to 3. Preferable examples of these silane coupling agents are: vinylbenzyl cationic silane having the chemical formula

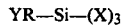
VB—NH—CH$_2$CH$_2$NH(CH$_2$)$_3$—Si(OCH$_3$)$_3$ where VB is CH$_2$=CH, or CH$_2$—; gamma-glycidoxypropyltrimethoxysilane having the chemical formula

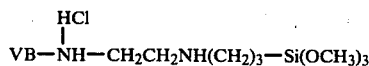
CH$_2$CHCH$_2$O(CH$_2$)$_3$Si(OCH$_3$)$_3$;

gamma-mercaptopropyltrimethoxysilane having the chemical formula

HSCH$_2$CH$_2$CH$_2$Si(OCH$_3$)$_3$;

beta-mercaptoethyltriethoxysilane having the chemical formula

HSCH$_2$CH$_2$Si(OC$_2$H$_5$)$_3$;

gamma-chloropropyltrimethoxysilane having the chemical formula

ClCH$_2$CH$_2$CH$_2$Si(OCH$_3$)$_3$;

n-beta-(aminoethyl) gamma-aminopropyl-trimethoxysilane having the chemical formula

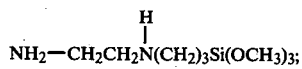
NH$_2$—CH$_2$CH$_2$N(CH$_2$)$_3$Si(OCH$_3$)$_3$;

and gamma-aminopropyltriethoxysilane having the chemical formula

NH$_2$CH$_2$CH$_2$CH$_2$Si(OC$_2$H$_5$)$_3$.

Other eligible silane coupling agents include vinyltriethyoxysilane; vinyl-tris (beta-methoxy-ethoxy)silane; gamma-methacryloxypropyltrimethoxysilane; beta-(3,4 epoxycyclohexy)ethyltrimethoxysilane; gamma-glycidoxypropyltrimethoxysilane; and vinyltriacetoxysilane. These titanate and silane coupling agents have bifunctional ends which exhibit a propensity to chemically bond with both the surface of the film, and with the mineral particulate.

A third alternative for a coupling agent is an ionic hydrocarbon copolymer defined as follows: an ethylene/methacrylic acid copolymer of (a) α-olefins having the formula R—CH=CH$_2$, where R is a radical selected from the class consisting of hydrogen and alkyl radicals having from 1 to 8 carbon atoms, and (b) and α,β-ethylenically unsaturated carboxylic acids having from 3 to 8 carbon atoms, said copolymer having from 10 percent to 90 percent of the carboxylic acid groups ionized by neutralization with metal ions uniformly distributed throughout the copolymer, said copolymer being a direct copolymer of the α-olefins and the unsaturated carboxylic acid in which the carboxylic acid groups are randomly distributed over all molecules; and in which: (1) the α-olefin content of the copolymer is at least 50 mol percent, based on the α-olefin-acid copolymer, (2) the unsaturated carboxylic acid content of the copolymer is from 0.2 to 25 mol percent, based on the α-olefin-acid copolymer, and (3) any other monomer component optionally copolymerized in said copolymer is monoethylenically unsaturated. Said neutralizing metal ions are selected to have an ionized valence of from one to three inclusive when the unsaturated acid is a monocarboxylic acid and an ionized valence of one when the unsaturated acid is a dicarboxylic acid. For a more detailed discussion of ionic hydrocarbon copolymers, reference can be made to U.S. Pat. No. 3,264,272 assigned to E. I. du Pont de Nemours and Company, Wilmington, Del., herein incorporated by reference. Such ionic hydrocarbon copolymers have two functionalities, one being attracted to the film surface, the other being attracted to the mineral particulate. The bonding of such an ionomeric resin to the film and mineral particulate is not pure chemical bonding as is the case with the titanate and silane coupling agents. The bonding taking place between the ionic hydrocarbon copolymer and the film and the mineral particulate is at least partially attributable to van de Waals' forces.

A number of methods have been employed to attach the coupling agent and mineral to the surface of the film. For example, following irradiation and hydrolysis or alcoholysis, the film can be introduced to a 1-5 percent solution of the coupling agent in an organic solvent. After drying the film, the mineral is attached to the film by contacting the film with an at least 3 percent mineral slurry. This slurry can be either alcoholic or aqueous however, if an alcoholic medium was used in the attachment of the coupling agent, an alcoholic medium is preferred.

If an ionic hydrocarbon copolymer such as Surlyn ® ionomer resin is to be used as a coupling agent, the two step process can be combined into one, that is, instead of attaching the coupling agent to the film, drying the film, and then attaching the mineral particulates, the film can be placed in a mineral slurry containing 5–40 percent ionic hydrocarbon copolymer. This one step process cannot be used with the titanate or silane coupling agents due to their bifunctionalities mentioned above. That is, the two reactive functionalities of an ionic hydrocarbon copolymer are such that one is attracted to the film surface, the other to the mineral. In contrast, both functionalities on the titanate and silane coupling agents have a greater attraction to the mineral particulates than to the EVA film surface. Therefore, if these coupling agents are in the presence of both the film and the mineral slurry, they react only with the mineral.

As seen in the examples below, this process for attaching the coupling agent and the mineral particulates to the surface of the film following the hydrolysis or alcoholysis of the film surface may be simplified further by coating the coupling agent onto the mineral particulate. In addition, as mentioned above and exemplified in the examples below, the hydrolysis or alcoholysis can be carried out in the presence of a mineral slurry without using a coupling agent; however, use of a coupling agent is preferred.

A more detailed understanding of the possible combinations of surface treatments of EVA film in the practice of the subject invention will be found in the examples that follow.

EXAMPLE I

EVA resin containing about 42 percent copolymerized vinyl acetate by weight and a melt index of about 55 gm/10 min (ASTM D1238, 190° C.) was extruded into 4–5 mil ($1 \times 10^{-2}$–$1.3 \times 10^{-2}$ cm) film. The film was subjected, at ambient temperature, to 10 MR of high energy electron beam radiation and treated with 25 percent $CH_3ONa$ in $CH_3OH$ at 25° C. for the removal of surface tack, water washed and vacuum dried. The samples were folded and a 50×190×25 mm (694 g) Al weight was placed on them at ambient temperature for five minutes. The treatment times and consequent results are tabulated below:

| Time of Treatment Sec. | Surface to surface tack (g/2.54 cm) (ASTM D882-756) | Stress Whitening |
|---|---|---|
| 0 | 280 | no |
| 5 | 60 | no |
| 10 | 60 | no |
| 15 | 40 | no |
| 20 | 40 | no |
| 25 | 0 | no |
| 30 | 0 | no |
| 35 | 0 | no |
| 40 | 0 | no |
| 45 | 0 | yes |
| 50 | 0 | yes |
| 55 | 0 | yes |
| 60 | 0 | yes |

Samples treated between 25–40 seconds at 25° C. showed removal of tack and no stress whitening when relaxed from 200 percent elongation. Samples treated shorter than 30 seconds showed tack and no stress whitening. Samples treated longer than 40 seconds showed no tack but whitened when released from 200 percent elongation and lost a considerable amount of elasticity.

EXAMPLE II

The procedure of Example 1 was repeated at slightly lower temperatures and the elastic recovery and transparency upon relaxation after being stretched were determined as a function of depth of greater than 80 percent hydrolysis. The results are tabulated below:

| Treat. Time Sec. | Temp. °C. | Elastic Recovery after 200% Elongation (%) | Depth of Hydro. (Est.) μm | Stress Whitening |
|---|---|---|---|---|
| 18 | 23.0 | 93 | 0.06 | no |
| 22 | 22.5 | 93 | 0.14 | no |
| 26 | 22.2 | 95 | 0.09 | no |
| 30 | 22.0 | 93 | 0.33 | no |
| 34 | 21.8 | 95 | 0.34 | no |
| 38 | 21.8 | 95 | 0.54 | (surface melt fracture) |
| 42 | 21.5 | 93 | 0.42 | no |
| 46 | 22.5 | 79 | 0.51 | yes |
| 50 | 22.0 | 81 | 0.49 | yes |
| 54 | 22.0 | 76 | 0.51 | yes |
| 58 | 22.0 | 78 | 0.54 | yes |
| 60 | 21.8 | 78 | 0.54 | yes |
| 64 | 21.8 | 77 | 0.55 | yes |

It is evident that if greater than about 80 percent hydrolysis is carried out at depths below 0.5 microns, stress whitening and loss of elastic recovery is observed.

EXAMPLE III

EVA resin containing 38–45 percent copolymerized vinyl acetate by weight and with a melt index of about 55 gm/10 min (ASTM D1238, 190° C.) was extruded into 4 mil $1 \times 10^{-2}$ cm film. The film was irradiated by 6 MR of high energy electron beam radiation, treated with 25 percent $CH_3ONa$ in methanol bath at temperatures of 19°–20° C. for 35 seconds. After water washing, the film retained a slight amount of surface tack which was removed by a subsequent treatment of the film with a 10 percent dispersion of Surlyn ® ionic hydrocarbon copolymer 56230 sold by E. I. du Pont de Nemours and Company, Wilmington, Del. in a 5 percent "Micro-White" 25 (sold by Sylacauga Calcium Products) $CaCO_3$ slurry in $CH_3OH$ at room temperature for 30 seconds. After water washing and vacuum drying, the resulting tack-free film was transparent upon relaxation after 200 percent elongation and heat sealable.

EXAMPLE IV

EVA resin containing 38–45 percent copolymerized vinyl acetate by weight and with a melt index of about 55 gm/10 min (ASTM D-1238, 190° C.) was extruded into 4 mil $1\times 10^{-2}$ cm film. The film was irradiated with 6 MR of high energy electron beam irradiation, treated with a 25 percent CH$_3$ONa solution in methanol containing about a 5 percent "Micro-White" 25—CaCO$_3$ mineral slurry for 35 seconds at 19°–20° C., water washed and vacuum dried. The resulting film was free of surface tack, acceptably heat sealable, and transparent upon relaxation after being stretched.

We claim:

1. A process for treating ethylene/vinyl acetate copolymer (EVA) comprising:
   (a) providing an EVA copolymer film containing about 35 to 50 percent copolymerized vinyl acetate by weight, said film being crosslinked as a result of being subjected to a 0.5 to 16 megarad dosage of high energy radiation; and
   (b) converting greater than about 50 percent of the acetate groups in the film to hydroxyl groups to a depth in the film of 0.5 microns, while converting less than 50 percent of the acetate groups at depths greater than 0.5 microns; and
   (c) contacting the resulting film with an at least 3 percent finely divided mineral slurry.

2. The process of claim 1 wherein step (b) is carried out by contacting the film with a solution of greater than 15 percent NaOCH$_3$ in CH$_3$OH.

3. The process of claim 1 wherein step (b) is carried out by contacting the film with a solution of greater than 25 percent KOH in CH$_3$OH.

4. A process for treating ethylene/vinyl acetate copolymer comprising:
   (a) providing an EVA copolymer film containing about 35 to 50 percent copolymerized vinyl acetate by weight, said film being crosslinked as a result of being subjected to a 0.5 to 16 megarad dosage of high energy radiation; and
   (b) converting greater than about 50 percent of the acetate groups in the film to hydroxyl groups to a depth in the film of 0.5 microns, while converting less than 50 percent of the acetate groups to depths greater than 0.5 microns;
   (c) attaching a coupling agent selected from the group consisting of silane coupling agents, ionic hydrocarbon copolymers and titanate coupling agents to the surface of the film by treating the film with a 1–5 percent solution of the coupling agent in an organic solvent; and
   (d) attaching finely divided mineral particulates to the coupling agent by treating the film to an at least 3 percent mineral slurry.

5. The process of claim 4 wherein step (b) is carried out by contacting the film with a solution of greater than 15 percent NaOCH$_3$ in CH$_3$OH.

6. The process of claim 4 wherein step (b) is carried out by contacting the film with a solution of greater than 25 percent KOH in CH$_3$OH.

7. A process for treating ethylene/vinyl acetate copolymer (EVA) comprising:
   (a) providing an EVA copolymer film containing about 35 to 50 percent copolymerized vinyl acetate by weight, said film being crosslinked as a result of being subjected to a 0.5 to 16 megarad dosage of high energy radiation; and
   (b) converting greater than 50 percent of the acetate groups in the film to hydroxyl groups to a depth in the film of 0.5 microns, while converting less than 50 percent of the acetate groups at depths greater than 0.5 microns; and
   (c) treating the film with a solution of 5–40 percent ionic hydrocarbon copolymer in an at least 3 percent aqueous finely divided mineral slurry.

8. The process of claim 7 wherein step (b) is carried out by subjecting the film to a solution of greater than 15 percent NaOCH$_3$ in CH$_3$OH.

9. The process of claim 7 wherein step (b) is carried out by subjecting the film to a solution of greater than 25 percent KOH in CH$_3$OH.

10. A process for treating ethylene/vinyl acetate copolymer (EVA) comprising:
    (a) providing an EVA copolymer film containing about 35 to 50 percent copolymerized vinyl acetate by weight, said film being crosslinked as a result of being subjected to a 0.5 to 16 megarad dosage of high energy radiation; and
    (b) converting greater than 50 percent of the acetate groups in the film to hydroxyl groups to a depth in the film of 0.5 microns, while converting less than 50 percent of the acetate groups at depths greater than 0.5 microns; and
    (c) treating the film with an at least 3 percent finely divided mineral slurry wherein the finely divided mineral particulates are coated with a coupling agent selected from the group consisting of silane coupling agents, titanate coupling agents, and ionic hydrocarbon copolymers.

11. The process of claim 10 wherein step (b) is carried out by contacting the film with a solution of greater than 15 percent NaOCH$_3$ in CH$_3$OH.

12. The process of claim 14 wherein step (b) is carried out by contacting the film with a solution of greater than 25 percent KOH in CH$_3$OH.

13. The process of claim 2, 5, 8 or 11 wherein the alcoholyzing step is carried out by contacting the film with the alcoholyzing medium for less than 60 seconds.

14. The process of claim 2, 5, 8 or 11 wherein the alcoholyzing step is carried out by contacting the film with the alcoholyzing medium for less than 30 seconds.

15. The process of claim 3, 6, 9 or 12 wherein the hydrolyzing step is carried out by contacting the film with the hydrolyzing medium for less than 60 seconds.

16. The process of claim 3, 6, 9 or 12 wherein the hydrolyzing step is carried out by contacting the film with the hydrolyzing medium for less than 30 seconds.

17. Crosslinked ethylene/vinyl acetate copolymer film containing about 35 to 50 percent copolymerized vinyl acetate by weight of the copolymer comprising:
    (a) greater than about 50 percent of the acetate groups in the film to a depth of 0.5 microns being replaced by hydroxyl groups, and less than 50 percent of the acetate groups to depths greater than 0.5 microns being replaced by hydroxyl groups;
    (b) a coupling agent selected from the group consisting of titanate coupling agents, silane coupling agents and ionic hydrocarbon copolymers attached to the surface of the film; and
    (c) finely divided mineral particulates attached to the coupling agent.

18. The film of claim 17 wherein the particle size of said mineral is 0.1 to 150 microns.

19. Crosslinked ethylene/vinyl acetate copolymer film containing about 35 to 50 percent copolymerized vinyl acetate by weight of the copolymer comprising:
    (a) greater than about 50 percent of the acetate groups in the film to a depth of 0.5 microns being replaced by hydroxyl groups and less than 50 percent of the acetate groups to depths greater than 0.5 microns being replaced by hydroxyl groups; and (b) finely divided mineral particulates attached to the surface of the film.

20. The film of claim 19 wherein the particle size of said mineral is 0.1 to 150 microns.

* * * * *